United States Patent [19]

Conrady et al.

[11] 4,340,648
[45] Jul. 20, 1982

[54] POLYVINYL CHLORIDE SUBSTRATES COATED WITH SINGLE PACKAGE WATER-BASED COMPOSITIONS

[75] Inventors: James A. Conrady, Amherst; William J. Driscoll, Lorain, both of Ohio

[73] Assignee: The B. F. Goodrich Company, Akron, Ohio

[21] Appl. No.: 164,489

[22] Filed: Jun. 30, 1980

[51] Int. Cl.$^3$ .................. B32B 27/08; C08D 1/09; C08L 31/00
[52] U.S. Cl. ............................ 428/518; 428/442; 428/461; 428/463; 428/514; 428/473; 428/520; 428/523; 524/376; 524/833
[58] Field of Search .............. 428/442, 473, 461, 514, 428/518, 520, 325, 523; 260/29.6 TA, 29.6 AN, 29.6 M, 29.6 E

[56] References Cited

U.S. PATENT DOCUMENTS

| | | | |
|---|---|---|---|
| 2,992,203 | 7/1961 | Protzman | 260/885 |
| 3,153,022 | 10/1964 | Calkins et al. | 260/86.1 |
| 3,334,003 | 8/1967 | Edwards | 156/237 X |
| 3,784,498 | 1/1974 | Ceska | 260/29.6 TA |
| 3,799,901 | 3/1974 | McCan et al. | 260/29.6 H |
| 4,172,064 | 10/1979 | Keeler | 260/29.6 M X |

Primary Examiner—P. Ives
Attorney, Agent, or Firm—George A. Kap

[57] ABSTRACT

Single-package coating or ink composition of pH 7 to 12 comprising a reaction product of a binder resin and a scavenging agent which reacts with anions of the initiator used to prepare the binder resin, the binder resin has a Tg of 20° to 70° C., is prepared in an aqueous medium devoid of emulsifiers, and is a polymer of an ethylenically unsaturated acid of 3 to 10 carbon atoms and an acrylic monomer(s) selected from alkyl acrylates and methacrylates containing 4 to 24 carbon atoms, amount of the acid being 0 to 5 parts per 100 parts of the acrylic monomer(s).

5 Claims, No Drawings

POLYVINYL CHLORIDE SUBSTRATES COATED WITH SINGLE PACKAGE WATER-BASED COMPOSITIONS

BACKGROUND OF THE INVENTION

Water-based inks and coatings are well known and many have been commercialized. Growth of such inks is expected to continue due to the economic and ecological factors. One such ink is disclosed in U.S. Pat. No. 4,172,064 to Keeler which comprises a four-component copolymer of an alkyl ester of acrylic acid, an alkyl ester of methacrylic acid, an unsaturated nitrile, an unsaturated carboxylic acid, a coalescing agent and a mixture of surfactants. The resulting copolymer has a Tg of less than 80° C., amount of alkyl esters of acrylic and methacrylic acids can vary from 50 to 80% by weight of the copolymer, amount of the carboxylic acid can vary from 2 to 15%, and amount of the nitrile is greater than amount of the carboxylic acid. Difunctional and trifunctional inorganic salts can be used as curing agents and reactive crosslinking materials can be incorporated to improve physical properties of coatings or inks. Due to the presence of surfactants and unreacted carboxyl groups, such inks have poor scrub and water resistance. Furthermore, toxicity problems associated with the nitriles, such as acrylonitrile, are also a source of concern.

Another example of a water-based ink is a two-package ink in which the first package comprises a mixture of a binder resin, flatting agent, and a co-solvent, whereas the second package comprises a crosslinking agent. The binder resin has a molecular weight of about 25,000, and is a copolymer of less than 5 parts acrylic acid, about 65 parts methyl methacrylate, and about 35 parts ethyl acrylate which is prepared by solution polymerization in an organic solvent. The ink is made by mixing the two packages before use.

Although the two-package ink, described above, has a number of outstanding features, it has the self-evident disadvantage of having to mix two components before use and storage thereof before use. It is, therefore, desirable to overcome the disadvantage of a two-package system while retaining its desirable features.

SUMMARY OF THE INVENTION

The scrub-resistant, single package ink or coating composition of this invention comprises 50 to 100 parts by weight binder resin having Tg of 20° to 70° C., 1 to 50 parts co-solvent, and a sufficient amount of a scavenging agent to bind initiator anions. In case of an ink composition, a pigment would also be included. The binder resin is prepared in an aqueous medium which is devoid of any emulsifier by polymerizing 1 to 5 parts of an ethylenically-unsaturated carboxylic acid with either one or more aliphatic esters of acrylic and methacrylic acids to yield copolymers with Tg falling within the range of 20° to 70° C. The co-solvents are selected from ether-alcohol compounds such as the Cellosolves and Carbitols, whereas the scavenging agents are selected from metal and alkaline earth metal salts, oxides, hydroxides and esters of lower aliphatic acids.

DETAILED DESCRIPTION OF THE INVENTION

The difference between the two-package and one-package systems resides in the crosslinking agent, which is omitted from the one-package system. The purpose of a crosslinking agent in the two-package system is to crosslink the binder resin and thus render it more water-resistant, harder and more resistant to abrasion and the action of detergents. Since the crosslinking agent is absent from the one-package system, its function is promoted by reducing carboxyl content in the binder resin, increasing molecular weight of the binder resin to a range of 50,000 to 600,000, and increasing amount of and selectivity of esters of acrylic and methacrylic acids which are more hydrophobic than their counterparts in the two-package system.

This invention relates to an ink or a coating composition comprising a binder resin in amount of 50 to 100 parts by weight, preferably 80 to 95 parts; sufficient amount of a scavenging agent to bind the initiator ions of the initiator used in polymerizing monomers of the binder resin, which can vary from 0.01 to 5 parts, preferably 0.1 to 1 part per 100 parts of the binder resin; and an organic co-solvent in amount of 1 to 50 parts, preferably 2 to 20 parts, per 100 parts of the binder resin. In the case of an ink composition, a pigment in the form of a dispersion is used in sufficient amount to obtain the desired color intensity. It is estimated that amount of a pigment can vary from 5 to 30 parts, preferably 10 to 20 parts, per 100 parts of the binder resin. The compositions of this invention are either neutral or alkaline when ready for use, and preferably have a pH of 7.5 to 9.

The binder resin suitable for our purposes has Tg in the range of 20° to 70° C., preferably 40° to 60° C., and a molecular weight of 50,000 to 600,000 and preferably 100,000 to 400,000, as determined by gel permeation chromatography. This resin is prepared in presence of an initiator in an aqueous medium but in absence of any emulsifier, unlike the preparation of the binder resin disclosed by the Keeler U.S. Pat. No. 4,172,064. The binder resin can contain 20 to 65% solids, preferably about 50%, and is stable; it can stand without any noticeable degradation for about 12 months and longer. Viscosity of the binder resin is 10 to 1000 cps at 25° C. Suitable initiators include persulfates, specific examples of which include persulfate salts such as ammonium, potassium and sodium. Amount of the initiator can vary from 0.1 to 5 parts per 100 parts of the monomer charge.

The monomers that are used in the polymerization of the binder resin include ethylenically unsaturated carboxylic acid, or a mixture of such acids, and one or more of aliphatic esters of acrylic and methacrylic acids which can produce a binder resin with a Tg in the range of 20° to 70° C., preferably 40° to 60° C. The carboxylic acid contains 3 to 10, preferably 3 to 5, carbon atoms per molecule and is used in an amount of 0 to 5, preferably about 3 parts per 100 parts of the acrylic monomers used to prepare the binder resin. Specific examples of such carboxylic acids include acrylic, methacrylic, itaconic, maleic, and fumaric acids. The carboxylic acid in the binder resin functions as a solubilizer by rendering the resin, in a salt form, water-soluble.

The aliphatic esters of acrylic and methacrylic acids contain from 4 to 24, preferably from 4 to 14 carbon atoms per molecule. These esters are selected in order to make a binder resin of desired Tg, which means that one or a number of such esters can be polymerized to obtain a binder resin suitable for purposes herein. In a preferred embodiment, however, a mixture of soft and hard monomers is used with Tg of each monomer and amount thereof selected to yield a binder resin with Tg in the range of 20° to 70° C., preferably 40° to 60° C. The soft monomers have Tg below about 20° C., preferably below 0° C., and include such aliphatic esters of acrylic acid as ethyl acrylate, butyl acrylate, 2-ethylhexyl acrylate, and generally aliphatic esters of acrylic and methacrylic acids containing 4 to 12 carbon atoms. The hard monomers suitable for use in preparing the binder resin have Tg in excess of about 35° C., preferably over 75° C., and include such aliphatic esters of methacrylic acid as methyl methacrylate, ethyl methacrylate, propyl methacrylate, and generally aliphatic esters of methacrylic acids containing 5 to 24, preferably 5 to 15 carbon atoms per molecule. Examples of Tg of some of better known acrylic homopolymers of the following monomers is given below:

| | |
|---|---|
| n-octyl acrylate | −80° C. |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | +3 |
| n-tetradecyl acrylate | +20 |
| t-butyl acrylate | +43 |
| methyl methacrylate | +105 |
| acrylic acid | +106 |
| methacrylic acid | +185 |
| ethyl acrylate | −22 |
| ethyl methacrylate | +65 |
| n-propyl acrylate | −44 |
| n-propyl methacrylate | +35 |
| n-butyl methacrylate | +21 |
| n-dodecyl methacrylate | −65 |
| n-octadecyl methacrylate | −100 |

Along with the monomers, a chain transfer agent can also be added to control molecular weight of the binder resin. Amount of the chain transfer agent can vary from 0 to 2 parts per 100 parts of the acrylic monomers and examples of such agents include mercaptans, such as t-octyl mercaptan or dodecyl mercaptan, and halogenated lower alkanes, such as bromotrichloromethane.

As a substitute for the hard acrylic monomers, a styrene-type monomer can be copolymerized with the ethylenically unsaturated carboxylic acid in amount of 1 to 50 parts per 100 parts of acrylic monomers used to prepare the binder resin. Examples of styrene-type monomers include styrene itself and α-methyl styrene.

The binder resin is neutralized with any suitable neutralizing agent in order to solubilize the resin in water. If neutralization is not made, the resin will not be readily dispersed with the other components in the formulation and the components will separate out. Examples of suitable neutralizing agents are alkaline materials such as hydroxides, carbonates, amines, etc. Specific examples of neutralizing agents include sodium hydroxide, potassium hydroxide, ammonium hydroxide, dimethyl ethanol amine, triethyl amine, and triethanol amine. The binder resin should be neutralized to a pH of 7 to 12, preferably 7.5 to 9.

The scavenging agent is selected from metal and alkaline earth metal salts, oxides, hydroxides and alkyl esters of such metals. Preferred metals and alkaline earth metals are divalent metals such as zinc, calcium, and barium. Examples of specific scavengers are zinc oxide, zinc acetate, calcium acetate, barium oxide, and barium acetate. Amount of the scavenging agent should be sufficient to scavenge or react with any residual anions from the initiator to form a precipitate. Addition of the scavenging agent should eliminate any soluble ions that would create water-soluble sites in inks or coatings prepared from the binder resin. Oxide and hydroxide scavengers appear to be preferred since there is a possibility that there can be free ester ions, such as acetate ions, in the solution after the metal or alkaline earth metal in the solubilized salt has reacted with the initiator anions. The remaining ester ions can introduce water-soluble sites into the final dried ink or coating composition.

The use of a co-solvent in the ink or coating composition of this invention promotes wetting of the substrate and also provides slip or lubricity for the composition. Substrates like polyvinyl chloride require the presence of a co-solvent in the coating composition to properly wet the surface. Polar solvents, like the alcohols, can be combined with higher boiling solvents to yield suitable solvents for our purpose to provide improved wetting and levelling properties of the final composition. Suitable solvents for purposes herein include ether-alcohol materials such as methyl or butyl Cellosolve, butyl Carbitol, butyl Carbitol acetate, and the like. Cellosolves are glycol alkyl ethers whereas Carbitols are diethylene glycol alkyl ethers. Cellosolve is a trademark for glycol ethyl ether whereas Carbitol is a trademark for diethylene glycol ethyl ether.

For certain type of printing, such as high shear printing, a lubricant is added to reduce the shear forces. Examples of suitable lubricants include silicones, stearates, polyolefin powders, and waxes.

Other materials are also added to the ink and coating formulations of this invention in amounts which are well known in the art. Although these materials are vital to the final product, they have only a minor effect on the intrinsic properties of the final product. Such materials include anti-foam agent to reduce foaming, anti-freeze agent to impart freeze-thaw property to the product, and fungicides and mildewcides to minimize degradation thereof. There may also be present other materials, such as ultraviolet light stabilizers and antioxidants, flatting agents, etc.

Suitable substrates for the inks and coating compositions of this invention include plastics, metals, wood, leather, concrete, paper, glass, etc. Compositions of this invention, however, are especially adapted to be used on polyvinyl chloride substrates.

A preferred coating composition of this invention was prepared by neutralizing a binder resin with dimethylaminoethanol to a pH of 8 and adding barium oxide scavenger thereto with agitation. A silica flatting agent was then added and dispersed in the binder resin by means of a low to medium shear with an air driven marine blade propeller. To improve wetting and levelling properties of the final product, butyl Cellosolve was added with agitation, and surprisingly, viscosity of the water-polymerized binder resin did not increase markedly as is usually the case with solvent-polymerized polymers. Lubricants can be added to the formulation, if necessary, for printing operations. Finally, water can be added to reduce viscosity, whenever desired.

The finished composition was drawn down on fabric-backed vinyl wallcovering stock with a direct gravure Anilox roller. The composition was then baked for one minute at 82° C., aged twenty four hours, and then scrub tested for 250 cycles with a detergent, pursuant to ASTM D2486-79 test. An ink that was resistant to the scrubbing action without any apparent loss of coating indicated the desired affect of a higher molecular weight acrylic resin combined with low level of an acrylic acid in producing a coating resistant to dilute alkaline solution.

The following examples illustrate preparation of a binder resin and various novel ink and coating compositions of this invention.

EXAMPLE 1

This example demonstrates preparation of a binder resin.

After heating 100 parts by weight water to about 80° C., a mixture was metered in over a period of 4 hours of 3 parts acrylic acid, 65 parts methyl methacrylate, 32 parts butyl acrylate, and 0.15 part of t-octyl mercaptan, as chain transfer agent to control molecular weight. Ammonium persulfate initiator was added separately in an amount of about one-half part. This mixture was held at about 80° C. for one hour to allow for polymerization of the acrylic monomers. Solids concentration of this binder resin was about 50% and its molecular weight, about 250,000.

EXAMPLE 2

This example demonstrates preparation of an ink composition of this invention which was composed of the following materials in parts by weight, unless otherwise indicated:

| | |
|---|---|
| binder resin of Ex. 1 | 200 |
| dimethyl amino ethanol | to pH 8 |
| barium oxide | 0.7 |
| water | 40 |
| Lo Vel 27 silica | 20 |
| butyl Cellosolve | 24 |
| water | 20 |
| Acrysol TT 678 | 8.4 |
| water | 60 |
| viscosity, Zahn #3 | 30 sec. |
| total solids | 33.7% |
| pigment dispersion | 20 |
| viscosity, Zahn #3 | 35 sec. |

The binder resin of Example 1 was neutralized with dimethylaminoethanol to a pH of 8 and barium oxide was added to bind the sulfate ions from the initiator. Then, 40 parts water, 20 parts Lo Vel 27 silica flatting agent and 24 parts butyl Cellosolve were added to the binder resin with mixing before adding another 20 parts water to reduce viscosity of the mixture. Butyl Cellosolve is glycol butyl ether or 2-butoxyethanol. Preparation of the ink composition was completed by admixing 8.4 parts Acrysol TT678 lubricant, 60 parts water and 20 parts of an aqueous pigment dispersion to obtain desired coloration. Final viscosity of the ink composition was 35 seconds, measured with Zahn #3 cup.

The ink composition, prepared as described in this Example 2, was drawn down on a white fabric-backed vinyl wallcovering stock with a direct gravure Anilox roller. The ink was baked for 1 minute at 82° C., aged for 24 hours and then subjected to the 250-cycle scrub test using a consumer detergent. Close visual scrutiny of the printed wallcovering indicated only a slight loss of the ink.

EXAMPLE 3

This example demonstrates the effect of pH variation and the use of different neutralizing agents on performance of the ink compositions of this invention.

The ink compositions were prepared by adjusting pH of 200 parts by weight of the binder resin of Example 1 with dimethylaminoethanol or other neutralizing agents to the desired level and then admixing 0.7 part of barium oxide scavenger in some instances and omitting it in others, as indicated in Table I, below. This was followed by addition with agitation of 40 parts water, 20 parts Lo Vel 27 silica flatting agent, and 24 parts butyl Cellosolve. At this point, the mixtures were very thick so 20 more parts of water was added to reduce viscosity thereof. After admixing Acrysol TT678 lubricant, 60 parts of additional water was added with mixing followed by 20 parts of an aqueous pigment dispersion. The final viscosity in seconds measured at 25° C. with a #3 Zahn cup is indicated in Table I which was attained by addition of more water, in some instances. Table I also sets forth results of a printing test and a scrub test on the various samples. The printing test involved the application of an ink composition by means of a laboratory scale printer and observation of the printing operation for wetting of the substrate, levelling of the ink, sharpness of print, and ink lubricity during printing. All of these inks wet out the polyvinyl substrate satisfactorily, flowed out and levelled acceptably, producing sharp prints. The differences between the inks were evident in their lubricity which was measured by a special high shear printing test.

In Table I, below, DMAE represents dimethylaminoethanol, NH4OH is ammonium hydroxide, NH4OH/DMAE is a 50/50 weight mixture of ammonium hydroxide and dimethylaminoethanol, AMP is 2-amino-2-methyl-1-propanol, DMAMP is 2-dimethylamino-2-methyl-1-propanol containing 80% nonvolatile matter and 20% water, PDA is propanediamine, TEA is triethylamine; in the column marked "High Shear Printing Test", B represents borderline, and NG stands for "no good"; in the column identified as "Scrub Test", OK means that no ink was removed and SL means slight loss of ink. A dash in the table represents that the test was not run or the substance is absent.

| Sample No. | BaO | Neutral Agent | Ink pH | Scrub Test | High Shear Printing Test |
|---|---|---|---|---|---|
| 1 | 0.7 | DMAE | 8.5 | OK | B, slight lack of lubricity |
| 2 | 0.7 | DMAE | 7.5 | OK | B, slight lack of lubricity |
| 3 | 0.7 | DMAE | 8 | OK | B, slight lack of lubricity |
| 4 | 0.7 | DMAE | 7 | — | NG, lacked lubricity, dragged |
| 5 | 0.7 | DMAE | 9 | — | NG, lacked lubricity, dragged |
| 6 | 0.0 | DMAE | 7 | — | NG, lacked lubricity, dragged |
| 7 | 0.0 | DMAE | 7.5 | — | NG, lacked lubricity, dragged |
| 8 | 0.0 | DMAE | 8 | OK | OK |
| 9 | 0.0 | DMAE | 8.5 | OK | NG, lacked lubricity, dragged |
| 10 | 0.0 | DMAE | 9 | — | NG, lacked lubricity, dragged |
| 11 | 0.7 | NH4OH | 7.5 | — | NG, lacked lubricity, dragged |
| 12 | 0.7 | NH4OH | 8.5 | — | NG, lacked lubricity, |

| Sample No. | BaO | Neutral Agent | Ink pH | Scrub Test | High Shear Printing Test |
|---|---|---|---|---|---|
| 13 | 0.7 | NH₄OH/ | 7.5 | — | NG, lacked lubricity, dragged |
| 14 | 0.7 | NH₄OH/ | 8.5 | OK | NG, lacked lubricity, dragged |
| 15 | 0.7 | AMP | 7.5 | — | NG, lacked lubricity, dragged |
| 16 | 0.7 | AMP | 8.5 | — | NG, lacked lubricity, dragged |
| 17 | 0.7 | DMAMP | 7.5 | OK | B, lacked lubricity, dragged |
| 18 | 0.7 | DMAMP | 8.5 | — | NG, lacked lubricity, dragged |
| 19 | 0.7 | PDA | 7.5 | — | NG, lacked lubricity, dragged |
| 20 | 0.7 | PDA | 8.5 | OK | OK |
| 21 | 0.7 | TEA | 7.5 | — | NG, lacked lubricity, dragged |
| 22 | 0.7 | TEA | 8.5 | — | NG, lacked lubricity, dragged |

The data set forth in Table I, above, indicates that best results were produced by the binder resin with barium oxide scavenger and neutralized to a pH in the range of 7.5 to 8.5 with dimethylaminoethanol, see Samples 1, 2 and 3. The binder resin without barium oxide scavenger neutralized to a pH of 8 with dimethylaminoethanol also gave very good results, see Sample 8. The binder resin prepared with barium oxide and neutralized to a pH of 8.5 with propane diamine also produced very good results in terms of scrub test and the printing test. Although the binder resin prepared with barium oxide and neutralized to a pH of 7.5 with dimethylaminomethyl propanol was borderline, however, it should perform acceptably with slight reformulation changes. Same applies to the other samples which are indicated to be borderline.

EXAMPLE 4

The principal object of this experiment is to determine the effect of varying the scavenger and amounts thereof in parts by weight using dimethylaminoethanol and propane diamine neutralizing agents. The ink compositions of this example were prepared as in Example 3 by neutralizing the binder resin of Example 1 to the pH indicated in Table II, below, then admixing a scavenger, flatting silica, butyl Cellosolve co-solvent, Acrysol TT678 lubricant, and an aqueous pigment dispersion. Enough water was added along the way to bring viscosity of the mixture into a range sufficiently thin to enable addition of the various materials, as already described. Final viscosity of the ink compositions herein was within the range of 18 to 29 seconds, as measured in a #3 Zahn cup at 25° C. Table II, below, sets forth the variables tested as well as results of the scrub test and the printing test.

TABLE II

| Sample No. | Scavenger Type | Amount | Neutr Agent | Ink pH | Scrub Test | High Shear Print Test |
|---|---|---|---|---|---|---|
| 23 | BaO | 0.7 | DMAE | 7.5 | OK | NG, lacked lubricity |
| 24 | BaO | 0.7 | DMAE | 8.0 | OK | OK, slight drag |
| 25 | BaO | 0.7 | DMAE | 8.5 | OK | OK |
| 26 | BaO | 0.7 | PDA | 7.5 | — | NG, lacked lubricity |
| 27 | BaO | 0.7 | PDA | 8.0 | — | NG, lacked lubricity |
| 28 | BaO | 0.7 | PDA | 8.5 | OK | B |
| 29 | — | 0.0 | PDA | 7.5 | OK | B |
| 30 | BaO | 0.7 | PDA | 8.0 | OK | OK |
| 31 | BaO | 0.7 | PDA | 8.5 | — | NG, lacked lubricity |
| 32 | BaAC₂ | 1.2 | DMAE | 7.5 | — | NG, lacked lubricity |
| 33 | BaO | 0.7 | DMAE | 7.5 | OK | OK |
| 34 | CaAc₂ | 1.3 | DMAE | 7.5 | | sample too grainy for use |
| 35 | CaAc₂ | 0.7 | DMAE | 7.5 | OK | OK |
| 36 | CaO | 0.3 | DMAE | 7.5 | OK | OK |
| 37 | Ca(OH)₂ | 0.4 | DMAE | 7.5 | OK | B, slight drag |
| 38 | ZnAc₂ | 0.8 | DMAE | 7.5 | | sample too grainy for use |
| 39 | ZnO | 0.4 | DMAE | 7.5 | NG | NG, lacked lubricity |
| 40 | ZrO | 0.6 | DMAE | 7.5 | OK | OK |
| 41 | BaAc₂ | 1.2 | DMAE | 8.5 | OK | B, slight drag |
| 42 | BaO | 0.7 | DMAE | 8.5 | OK | OK |
| 43 | CdAc₂ | 1.3 | DMAE | 8.5 | | sample too grainy for use |
| 44 | CaAc₂ | 0.7 | DMAE | 8.5 | OK | OK |
| 45 | CaO | 0.3 | DMAE | 8.5 | OK | OK |
| 46 | Ca(OH)₂ | 0.4 | DMAE | 8.5 | — | NG, lacked lubricity |
| 47 | ZnAc₂ | 0.8 | DMAE | 8.5 | OK | B, slight drag |
| 48 | ZnO | 0.4 | DMAE | 8.5 | OK | OK |
| 49 | ZrO | 0.6 | DMAE | 8.5 | OK | OK |
| 50 | — | 0.0 | DMAE | 7.5 | — | NG, lacked lubricity |

On the basis of experimental data, it appears that a cosolvent is necessary in the formulation in order for the aqueous ink to wet out the hydrophobic surface of the polyvinyl chloride substrate. Presence of a cosolvent also adds lubricity to the liquid ink during the printing operation.

Inks number 23, 24, 25, 26, 28, and 33 in Table II were repeats of inks 2, 3, 1, 19, 20, and 2, respectively, in Table I. This duplication was necessary in order to determine the reproducibility of the ink formulating and testing procedures. Reproducibility was good except for ink 28 of Table II which was not quite as good on the high shear printing test as ink 20 in Table I. The only anomoly was ink 23 of Table II which did not perform nearly as well as its predecessor, ink 2 in Table I. However, ink 33, which was a later duplicate of ink 23 in Table II, did correlate well with ink 2 in Table I. The data on inks 24, 25, 26, 28, 33, and 42 confirm the conclusions reached from the data of Table I that the best printing inks were the binder of Example I when neutralized to a pH of 7.5 to 8.5 with DMAE or to 8.5 with PDA and include barium oxide as a scavenger for the catalyst fragments. Neutralizing with PDA to a pH of 8.5 but leaving out the BaO scavenger caused a drastic reduction in ink printing properties (refer to inks 28 and 31 in Table II).

Evaluating different divalent metal ions and different salts (oxides, hydroxides, and acetates) of these ions indicated that BaO, CaOAc, CaO and ZrO can be used as scavengers for the initiator fragments in the binder resin and the resulting resin solution produces excellent inks.

We claim:

1. Article of manufacture comprising a coating composition adhering to a substrate comprising polyvinyl chloride, said coating composition comprising a reaction product of a binder resin, a scavenging agent which reacts with the anions of the persulfate initiator used to prepare said binder resin, and a sufficient amount of an alkaline neutralizing agent to render said composition neutral to alkaline, said binder resin, being devoid of an unsaturated nitrile residue, is prepared in absence of emulsifier and has Tg of about 20° to 70° C., molecular weight of 50,000 to 600,000, and is a polymer of an ethylenically unsaturated carboxylic acid containing 3 to 10 carbon atoms and an acrylic monomer selected from alkyl acrylates and methacrylates containing 4 to 24 carbon atoms, amount of said carboxylic acid being 0 to 5 parts per 100 parts of said acrylic monomers.

2. Article of claim 1 wherein said binder resin is prepared in an aqueous medium in presence of the initiator, molecular weight of said binder resin is 100,000 to 400,000 and its viscosity is 10 to 1,000 cps at 25° C., said acrylic monomer is a combination of a soft monomer with a Tg of less than about 0° C. and a hard monomer with a Tg of above 75° C., said scavenging agent is used in amount of 0.1 to 1 part per 100 parts of said binder resin and is selected from metal and alkaline earth metal oxides, hydroxides, and alkyl esters thereof.

3. Article of claim 2 wherein said carboxylic acid is acrylic acid and amount thereof is about 3 parts.

4. Article of claim 3 wherein said binder resin is a polymer of about 3 parts acrylic acid, about 30 parts n-butyl acrylate and about 65 parts methyl methacrylate; and said scavenging agent is selected from barium oxide, barium acetate, cadmium acetate, calcium acetate, calcium oxide, calcium hydroxide, zinc acetate, zinc oxide, zirconium oxide, calcium acetate, and mixtures thereof.

5. Article of manufacture of claim 1 wherein said binder resin is a reaction product consisting essentially of 0 to 5 parts of said carboxylic acid and 100 parts of an acrylic monomer or a mixture thereof selected from said alkyl acrylates and methacrylates.

* * * * *